Sept. 23, 1947. R. L. MALCOM ET AL 2,427,918
INDUSTRIAL EYESHIELD
Filed July 3, 1943
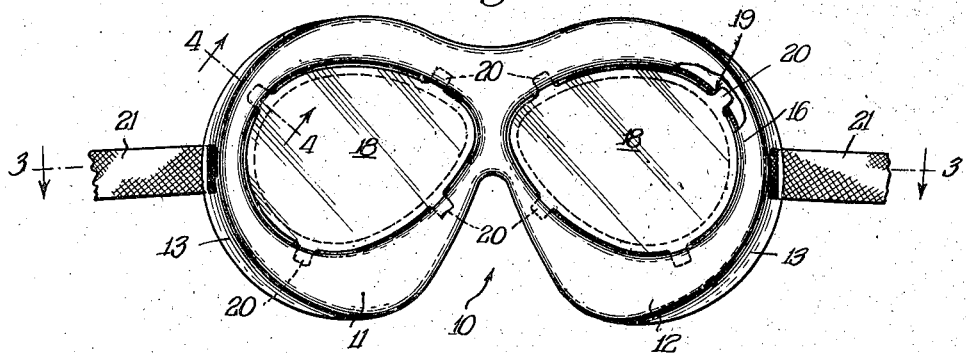
Fig. 1.
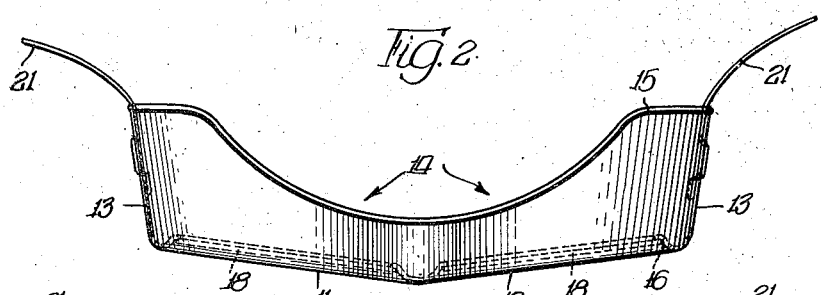
Fig. 2.
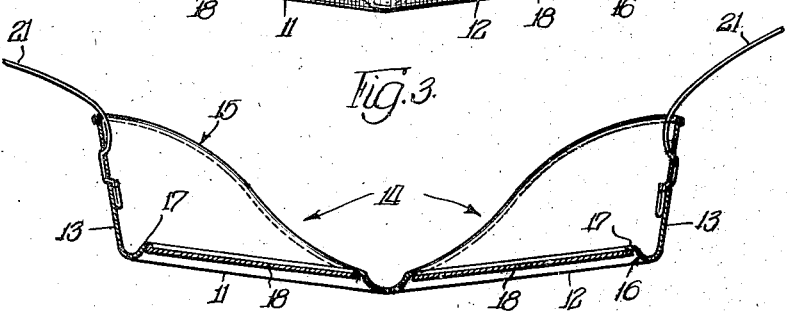
Fig. 3.
Fig. 4.
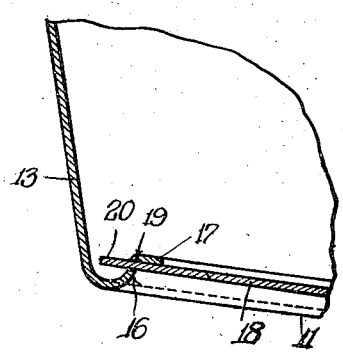
Fig. 5.
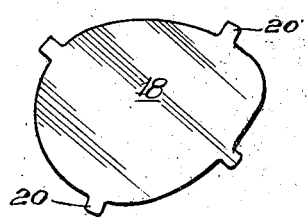
INVENTORS.
Robert L. Malcom,
BY Willis Z. Whipple, Patented Sept. 23, 1947

2,427,918

UNITED STATES PATENT OFFICE 2,427,918

INDUSTRIAL EYESHIELD

Robert L. Malcom and Willis Z. Whipple, Chicago, Ill., assignors to Chicago Eye Shield Company, Chicago, Ill., a corporation of Illinois Application July 3, 1943, Serial No. 493,320

4 Claims. (Cl. 2—14)

The present invention relates to industrial eye shields. More particularly, it pertains to an improved industrial eye shield preferably of a thermoplastic nature with readily removable and interchangeable lenses, which are of a novel construction, and possess other correlated improvements and discoveries whereby the utility of such a device is considerably enhanced.

Conventional types of industrial eye shields have been made from rectangularly shaped blanks of material which are curved throughout their plane and fitted over and around the eyes of the wearer. The arcuate bulge which thus is developed often causes distortion of vision to the user and has not altogether proved practical. It has also been suggested that such blanks of material, instead of being kept generally of a rectangular configuration, should be drawn, or heat-pressed, in such a manner that depth would be lent to the shield, so that a planular portion remained across the frontal plane without the necessity for flexing. However, such shields have also proven unsatisfactory due to the fact that, in the dieing and pressing operations, various imperfections are developed, such as striae, bubbles, blisters, burning during forming, etc. In the backwardly extending portions this will be relatively unimportant but through the visual areas of the lens these imperfections present additional difficulties and disadvantages.

It is, therefore, an object of the present invention to overcome the foregoing difficulties as well as other disadvantages, and to provide an industrial eye shield which is economic of manufacture, simple yet sturdy and durable of construction, and which is well adapted to the purposes for which it is intended.

Specific objects of the invention are the provision of an industrial eye shield wherein lenses, which have not been subjected to distortion, can easily and readily be made removable and interchangeable in a drawn structure; in which the lenses remain planular and perfect throughout their visual area and readily are interchangeable to the extent that left or right lenses can be used in either side of the lens-holding openings; to provide a drawn lens-holding structure which is recessed with lens-receiving and locking means and which do not protrude beyond the frontal plane of the frame structure; and, to provide lenses having locking elements which readily and interchangeably can be flexed into operative position within the lens-holding framework.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the application of which will be indicated in the claims.

For a fuller understanding of the nature and objects of the invention, reference should be had to the following detailed description taken in connection with the accompanying drawing, in which:

Fig. 1 is a front elevational view, with a fragment removed and partly in section, of a frontal portion of a preferred form of the present invention;

Fig. 2 is a top plan view of the device depicted in Fig. 1;

Fig. 3 is a horizontal transverse view, partly in section, taken along the lines 3—3 of Fig. 1 and looking in the direction of the arrows;

Fig. 4 is a plan view of a fragmentary portion of the device, partly in section, and taken in the region 4—4 of Fig. 1; and Fig. 5 is a plan view of an interlocking, removable, and interchangeable lens preferred for use in conjunction with the present invention.

Referring more particularly to the drawing, there is illustrated generally at 10 a preferred embodiment of an industrial eye shield contemplated by the present invention. The shield consists of a frontal area of two portions 11 and 12. The remaining frame structure is backwardly curved from its frontal portion as at 13, 13. It will also be observed that the backwardly curved and remaining edges of the shield are contoured as indicated generally at 14, 14 around which they are provided with a protective flare 15 preferably beaded. Referring again to the frontal portions 11 and 12, it will be seen that the lens-receiving areas are depressed as at 16, i. e. recessed, providing shoulders 17 to receive and interlockingly to engage removable and interchangeable lenses 18, 18. These recesses are provided with a plurality of apertures 19, 19 to receive extension members or lugs 20, 20 integral with the lenses 18.

It will be seen that the bridge of the shield across the nose portion is more reduced in size than any other portion of the device and this feature permits ready bending and flexing of the entire shield but in that area only, so that no distortion to the lenses results.

The beaded edge areas are contoured so as readily to conform to the face of the wearer when drawn together by straps 21 provided therefor. The bending or flexing takes place at the bridge portion but the lenses themselves are sufficiently freely mounted in their interlocking position to permit end play without having imparted to them any flexing action.

A preferred method of manufacturing such a device contemplates the provision of a rectangularly shaped blank preferably of a thermoplastic nature, although thermosetting materials can be used. Thermoplastic materials which are preferred are cellulose acetate, vinyl chloride, methacrylate, or any other suitable slow-burning material, or preferably one that will not support combustion.

The blank of material is first submitted to a cutting operation such as, for example, a suitable cutting press in which the apertures 19 are cut.

Simultaneously with the cutting of the apertures, the perimetrical configuration is also cut as desired. At this time there also is formed the reduced bridge area and the remaining portions of the framework to receive the next step in the manufacture of the device.

The flattened, cut, and apertured blank preferably now is placed in a forming press, heated and formed to shape by backwardly bending certain areas of the frontal regions 11 and 12, without distortion to the frontal plane portion which itself should remain intact except for a slight backward bend which may develop at the nose bridge. At the same time this forming operation takes place the area in the lens region of the frontal plane portion is depressed or drawn in a manner such that the same is pressed a suitable distance below the frontal plane region, offsetting the position of the apertures from horizontal to substantially vertical and at the same time providing a shoulder 17.

Lens plates, such as those illustrated at 18, are then stamped out of flat and undistorted material in any suitable manner, and upon proper flexing of the shield these projections will become located into the apertures and the lens become firmly seated and locked in position against the shoulder.

By an industrial eye shield construction within the scope of the invention as herein described, it will be seen that many advantages are present. For example, these lenses can be made colored and of various thicknesses depending upon the particular purposes for which the device is intended. The lenses are readily removable and interchangeable, as heretofore indicated and, since they are made from undistorted and unheated stock, provide a clear vision for industrial purposes. At the same time any distortion of the frame structure 10, in fitting it to facial contour of a user to which such a device might be subjected, permits no flexing of the lenses themselves. Also, for certain uses the frame itself can be made in different colors, particularly when bright lights are reflected from lateral points so as to disturb or provoke a glare to both the central and peripheral vision of an operator. All of these disadvantages can be prevented by use of the device herein described.

It will thus be seen that the objects hereinbefore set forth may readily and efficiently be attained, and since certain changes may be made in the above article and different embodiments of the invention could be made without departing from the scope thereof, it is intended that all matter contained in the above description shall be interpreted as illutrative and not in a limiting sense.

It is also to be understood that the following claims are intended to cover all of the generic and specific features of the invention as herein described, and all statements of the scope of the invention which, as a matter of language, might be said to fall therebetween.

We claim:

1. A method of making industrial eye shields of the class described, comprising in combination, providing a rectangularly shaped blank of plastic material and cutting the same into any desirable perimetrical configuration, forming a plurality of apertures around each lens holding region in said structure, heating and pressing said cut blank in its frontal plane area in each lens region below the frontal surface to provide a lens recess receiving shoulder and substantially vertically to offset the structure in the area of said apertures and backwardly to curve the remaining portion of said structure lying adjacent said frontal surface, removing portions of said material from said lens areas within the inner confines of said apertures to provide lens-receiving openings, providing lens plates from a flat unflexed and undistorted sheet of thermoplastic material with locking means thereon adapted to be accommodated by said apertures, and fitting said lenses within said structure.

2. An industrial eye shield comprising a single blank of rigid molded plastic material having a frontal section, backwardly curved top and side sections terminating in contoured edges, said shield being adapted to fit protectively against the face and around the eyes of a person wearing the same, the frontal sections having cut-out portions providing lens-receiving openings, marginal portions around said openings being backwardly curved with oppositely disposed apertures therein, said marginal portions having inwardly flared shoulders against which to seat said lenses, and resilient protective lenses having peripheral extensions thereon projecting into said apertures and interlockingly holding said lenses seated against said shoulders.

3. In an industrial eye shield, a rigid protective lens-holding frame, said frame comprising a frontal section having cut-out areas with marginal portions around the cut-out sections being bent backwardly substantially normal to the frontal section and terminating in ledges against which to seat lenses from the front of the frame, said backwardly bent portions having apertures therein, resilient lenses seated against said ledges and being disposed inwardly of the front plane of said frame, and extensions on the lenses projecting into the apertures interlockingly to hold said lenses in position.

4. An industrial eye shield comprising a single blank of rigid molded plastic material having a frontal section, backwardly curved top and side sections terminating in contoured edges, said shield being adapted to fit protectively against the face and around the eyes of a person wearing the same, the frontal sections having cut-out portions providing lens-receiving openings, marginal portions around said openings being backwardly curved with oppositely disposed apertures therein, said marginal portions having inwardly flared shoulders against which to seat said lenses, resilient protective lenses having peripheral extensions thereon projecting into said apertures and interlockingly holding said lenses seated against said shoulder, said backwardly curved top and side sections which terminate in contoured edges being marginally bent to provide a rounded cushion-like bead to rest against the face of the wearer when the shield is flexed across the nose bridge, thereby regidifying and strengthening said shield.

ROBERT L. MALCOM.
WILLIS Z. WHIPPLE.

REFERENCES CITED

The following references are of record in the file of this patent:

UNITED STATES PATENTS

| Number | Name | Date |
|---|---|---|
| 2,068,849 | De Witt | Jan. 26, 1937 |
| 2,182,104 | Wilen et al. | Dec. 5, 1939 |
| 2,274,791 | Huggins | Mar. 3, 1942 |
| 2,015,475 | Helfenstein | Sept. 24, 1935 |
| 1,963,437 | Gray | June 19, 1934 |
| 1,243,820 | Day | Oct. 23, 1917 |
| 2,194,192 | Auer | Mar. 19, 1940 |

FOREIGN PATENTS

| Number | Country | Date |
|---|---|---|
| 320,755 | Great Britain | Oct. 24, 1929 |
| 684,750 | France | Mar. 24, 1930 |
| 290,771 | Great Britain | May 24, 1928 |